United States Patent
Kienreich et al.

(10) Patent No.: US 9,851,012 B2
(45) Date of Patent: Dec. 26, 2017

(54) VACUUM VALVE SEAL (71) Applicant: VAT Holding AG, Haag (CH)

(72) Inventors: Martin Kienreich, Horbranz (AT); Martin Netzer, Bludenz (AT)

(73) Assignee: VAT Holding AG, Haag (CH)

( * ) Notice: Subject to any disclaimer, the term of this patent is extended or adjusted under 35 U.S.C. 154(b) by 173 days.

(21) Appl. No.: 14/669,108

(22) Filed: Mar. 26, 2015

(65) Prior Publication Data
US 2015/0285382 A1 Oct. 8, 2015

(30) Foreign Application Priority Data

Apr. 2, 2014 (AT) .................................. A 241/2014

(51) Int. Cl.
F16K 1/42 (2006.01)
F16K 31/122 (2006.01)
F16K 41/10 (2006.01)
F16K 27/02 (2006.01)

(52) U.S. Cl.
CPC ................ F16K 1/42 (2013.01); F16K 27/02 (2013.01); F16K 31/1221 (2013.01); F16K 41/103 (2013.01)

(58) Field of Classification Search
CPC .......... F16K 1/42; F16K 27/02; F16K 41/103; F16K 31/1221
USPC ........................... 251/357–364; 137/103, 526
See application file for complete search history.

(56) References Cited

U.S. PATENT DOCUMENTS

| 541,714 | A | * | 6/1895 | Shaw | F16K 24/06 |
| | | | | | 137/526 |
| 1,947,257 | A | * | 2/1934 | Fritz | F16K 27/0272 |
| | | | | | 137/375 |
| 2,108,256 | A | * | 2/1938 | Dym | A62B 18/00 |
| | | | | | 128/201.15 |
| 2,481,214 | A | | 9/1949 | Harper | |
| 2,973,978 | A | * | 3/1961 | Oppenheim | F16J 15/166 |
| | | | | | 277/434 |
| 3,863,668 | A | * | 2/1975 | Waters | F16K 27/00 |
| | | | | | 137/375 |
| 4,136,854 | A | | 1/1979 | Ehmig et al. | |
| 5,011,162 | A | * | 4/1991 | Jelinek | F01M 11/0408 |
| | | | | | 277/644 |

(Continued)

FOREIGN PATENT DOCUMENTS

CH 600223 6/1978
CN 202992212 6/2013
(Continued)

Primary Examiner — Jessica Cahill
Assistant Examiner — Daphne M Barry
(74) Attorney, Agent, or Firm — Volpe and Koenig, P.C.

(57) ABSTRACT

A vacuum valve includes a valve housing (1) having a first housing part (1a) and a second housing part (1b), between which a ring-shaped housing seal (3b) is arranged, and a closure member (9) which is adjustable between an open position in which the vacuum valve is open and a closed position in which the vacuum valve is closed. The housing seal (3b) is mounted on a ring-shaped carrier (3a). Additionally on the carrier (3a) radially inside the housing seal (3b) is mounted a ring-shaped seat seal (3c) against which the closure member (9) is pressed with the closure member (9) in the closed position, wherein the seat seal (3c) abuts against a sealing face of the valve housing (1).

10 Claims, 5 Drawing Sheets

(56) References Cited

U.S. PATENT DOCUMENTS

| | | | | |
|---|---|---|---|---|
| 5,188,150 | A * | 2/1993 | Esplin | F16K 1/42 |
| | | | | 137/630.14 |
| 5,427,358 | A | 6/1995 | Eggleston et al. | |
| 5,533,543 | A * | 7/1996 | Semeia | B29C 37/0085 |
| | | | | 137/15.18 |
| 5,607,167 | A * | 3/1997 | Franckx | F16J 15/022 |
| | | | | 174/653 |
| 5,678,595 | A * | 10/1997 | Iwabuchi | F16K 49/002 |
| | | | | 137/341 |
| 6,003,551 | A * | 12/1999 | Wears | F16K 1/06 |
| | | | | 137/625.33 |
| 6,289,932 | B1 | 9/2001 | Thackeray et al. | |
| 6,305,665 | B1 * | 10/2001 | Coura | F16K 41/103 |
| | | | | 251/319 |
| 6,669,170 | B2 | 12/2003 | Kersken et al. | |
| 6,761,360 | B2 * | 7/2004 | Hammi | F16J 15/122 |
| | | | | 220/806 |
| 7,011,294 | B1 | 3/2006 | Ehrne et al. | |
| 7,059,612 | B2 * | 6/2006 | Kuribayashi | F16B 43/001 |
| | | | | 277/637 |
| 7,380,571 | B2 * | 6/2008 | Okamoto | F16J 15/104 |
| | | | | 137/625.63 |
| 9,695,948 | B2 * | 7/2017 | Kienreich | F16K 1/523 |
| 2002/0023682 | A1 * | 2/2002 | Tokuda | F16K 11/044 |
| | | | | 137/625.5 |
| 2004/0232369 | A1 * | 11/2004 | Kajitani | F16K 31/1221 |
| | | | | 251/122 |
| 2009/0194728 | A1 | 8/2009 | Pickett et al. | |
| 2014/0367601 | A1 * | 12/2014 | Rada | F16K 1/42 |
| | | | | 251/333 |
| 2015/0316051 | A1 * | 11/2015 | Rowland | F04B 39/108 |
| | | | | 251/129.01 |

FOREIGN PATENT DOCUMENTS

| | | |
|---|---|---|
| DE | 3125034 | 1/1983 |
| DE | 3717724 | 12/1988 |
| DE | 4023845 | 4/1992 |
| DE | 102005004987 | 8/2006 |
| DE | 102008003725 | 7/2009 |
| GB | 990624 | 4/1965 |
| WO | 2012162051 | 11/2012 |

* cited by examiner

Fig. 13

VACUUM VALVE SEAL

INCORPORATION BY REFERENCE

The following documents are incorporated herein by reference as if fully set forth: Austrian Patent Application No. A241/2014, filed Apr. 2, 2014.

BACKGROUND

The invention relates to a vacuum valve including a valve housing having a first housing part and a second housing part, between which a ring-shaped housing seal is arranged, and a closure member which is adjustable between an open position in which the vacuum valve is open and a closed position in which the vacuum valve is closed.

It is known and usual to realize valve housings of vacuum valves with several parts and to seal the individual housing parts in relation or one another by means of elastic sealing rings, which are also designated as "static seals". In this connection, a housing cover of the valve housing is mostly realized as a separate part which is connected to a basic body of the valve housing by means of a seal in order to enable or facilitate the vacuum valve to be assembled and, where applicable, a service to be carried out.

These types of vacuum valves can be realized, for example, in the form of angle valves, as are known, among other things, from U.S. Pat. Nos. 6,669,170B2, 6,289, 932B1, DE 40 23 845 C1, US 2009/0194728A1, DE 10 2005 004 987 A1, DE 10 2008 003 725 A1 and DE 31 25 034 A1. However, slide valves and L-valves, for example, are also realized in this form. In the case of slide valves, the closure member is displaced in a straight line from its open position into its closed position or a carrier part carrying the closure member is displaced in a straight line from a start position into an end position, lever or expansion elements, which press the closure member against the valve seat at an angle to the direction of movement of the carrier, acting in the end position or close to the end position. Such slide valves mostly comprise only one single actuator which moves the carrier part or they can also be actuated by a manual actuating means. An L-shaped movement of the, in particular plate-shaped, closure member can also be carried out by separate actuators which act in the longitudinal or transverse direction of a valve rod or a valve rod can initially be displaced in a straight line and then tilted, for example by means of a link guide in order to place the closure member against the valve seat.

A vacuum valve where the valve housing is divided 'lengthwise' in two such that each of the two housing parts comprises one of the valve openings, the two housing halves being connected together by means of a sealing ring, proceeds from DE 37 17 724 A1.

It is also known to realize at least one flange of the valve housing, which comprises a valve opening, as a separate part and to connect it to the basic body of the valve housing by means of an elastic sealing ring. Such realizations proceed, for example, from GB 990,624. One of the flanges which is sealed in relation to the basic body by means of a sealing ring also comprises, in this connection, a sealing face against which, with the vacuum valve closed, the closure member is pressed by way of an elastic sealing ring which is arranged thereon (='dynamic seal" of the vacuum valve).

In the case of conventional vacuum valves, the dynamic seals are mostly mounted on the closure member and the valve seat is formed by a sealing face against which the closure member abuts with the seal arranged thereon when the vacuum valve is closed. However, it is also known to provide an elastic seal on the sealing seat against which the closure member abuts in a closed position by way of a sealing face of the closure member.

WO 2012/162051 A1 makes known connecting two or more O-ring seals by means of a thin web which is realized in one piece with the material of the O-ring seals. As a result, the O-ring seals are able to be arranged so close together that there is not enough space for realizing dovetail grooves for all the O-ring seals. In this case, an O-ring seal inserted into a dovetail groove is able to hold at least one other O-ring seal inserted into a rectangular groove.

SUMMARY

It is the object of the invention to provide a vacuum valve of the type mentioned in the introduction which is able to be realized in cost-efficient manner and is able to be mounted in a simple manner. This is achieved by a vacuum valve with one or more features of the invention, as described below and in the claims.

In the case of the vacuum valve according to the invention, the housing seal, which is arranged between the first and the second housing part and seals said housing parts against one another, is mounted on a ring-shaped carrier. Additionally mounted on the carrier radially inside the housing seal is a ring-shaped seat seal against which the closure member is pressed in its closed position. The seat seal, in this connection, abuts against a sealing face of the valve housing. In particular, one of the two housing parts sealed by the housing seal comprises the sealing face. With the closure member in the closed position, the closure member is sealed in relation to the valve housing by means of the seat seal.

In the case of the vacuum valve according to the invention, a component is consequently provided which is also designated below as a sealing unit and which comprises, on the one hand, the housing seal which forms a static seal between two housing parts of the valve housing and, on the other hand, the seat seal which forms the dynamic seal which seals the passage through the vacuum valve when the vacuum valve is closed. The seat seal together with the sealing face of the housing part on which it rests forms the valve seat of the vacuum valve.

In the case of a vacuum valve according to the invention, a simple assembly operation can be made possible, the housing seal and the seat seal being parts of a common component, as a result of which simple handling is achieved. In addition, the valve housing can be realized very simply in the region of the sealing seat, in particular can comprise a flat sealing face against which the seat seal abuts.

In one possible embodiment, the housing seal and the seat seal are vulcanized onto the carrier which, in said embodiment, preferably consists of metal. The carrier, in this connection, comprises a greater modulus of elasticity than the housing seal and the seat seal. In another possible embodiment, the housing seal and the seat seal are integrally molded onto the carrier, the carrier being formed of a plastics material which, where applicable, contains additives such as reinforcing fibers and comprises a greater modulus of elasticity than the material from which the housing seal and the seat seal are made. In both embodiments it is advantageous when the housing seal protrudes radially outward beyond the carrier over the entire outside periphery of the carrier and the seat seal protrudes radially inward beyond the carrier over the entire inside periphery of the carrier.

In one advantageous embodiment of the invention, the vacuum valve is realized in the form of an angle valve and the first and the second housing part, between which is located the housing seal, are formed by a basic body of the valve housing and a part of the valve housing which comprises a valve opening. This part of the valve housing which comprises the valve opening is provided with a flange for connecting the vacuum valve to a further vacuum component, for example a chamber or a vacuum line. The sealing face, against which the seat seal abuts, is arranged in this connection advantageously on the second housing part, which comprises the valve opening, and surrounds the axis of the valve opening.

BRIEF DESCRIPTION OF THE DRAWINGS

Further advantages and details of the invention are explained below by way of the accompanying drawing, in which.

DETAILED DESCRIPTION OF THE PREFERRED EMBODIMENTS

A first exemplary embodiment of a vacuum valve according to the invention is shown in FIGS. 1 to 9.

The vacuum valve comprises a valve housing 1. In the exemplary embodiment, said vacuum valve includes a first housing part 1a which realizes a basic body of the vacuum valve and a second housing part 1b which comprises a valve opening 5 with an axis 7. The first and the second housing part 1a, 1b are sealed in relation to one another by means of a ring-shaped housing seal 3b which is described in more detail further below.

The second housing part 1b which comprises the valve opening 5 comprises a connection flange 11. The vacuum valve can be connected to a further vacuum component, for example a vacuum chamber or a vacuum line, by means of said connection flange. The connection flange 11 is arranged on a tubular portion of the housing part 1b. On its end facing the housing part 1a, the housing part 1b comprises a connecting flange 12 for connecting to the housing part 1a. The housing part 1b can also be designated as a valve connector.

The housing part 1a which forms the basic body of the valve housing is provided with a valve connector which is realized integrally with the basic body of the valve housing or with a valve connector which is welded onto the basic body. This valve connector comprises a further valve opening 6 of the vacuum valve with an axis 8 and includes a tubular portion and a connection flange 13 which is arranged on the free end of the tubular portion for connecting the vacuum valve to a further vacuum component.

The housing parts 1a, 1b are formed, for example, of aluminum. As an example, realization from high-grade steel is also possible.

In the exemplary embodiment, a cylinder 14 of a pneumatic piston/cylinder unit is placed onto an open side of the housing part 1a. Said piston/cylinder unit provides an actuator 15 for automatically adjusting (by machine) the closure member 9. The bottom 14a of the cylinder 14 which closes off the open side of the housing part 1a could consequently also be seen as a housing part of the valve housing 1 in the form of a housing cover. This bottom 14a of the cylinder 14, however, is located outside the vacuum region of the vacuum valve in the exemplary embodiment, as explained in more detail below.

The exemplary embodiment of the vacuum valve shown is realized in the form of an angle valve. The axes 7, 8 of the first and second valve opening 5, 6 are consequently at an angle, in particular a right angle, with respect to one another.

Figure 15:
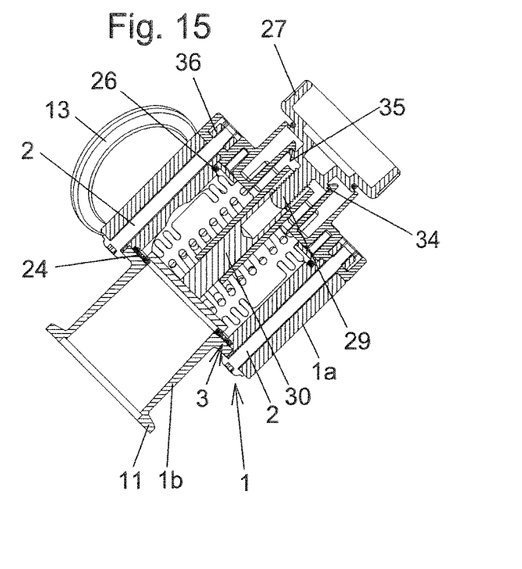
FIG. 15 shows a section along the line E-E of FIG. 14 with the closure member in the closed position.
Figure 16:
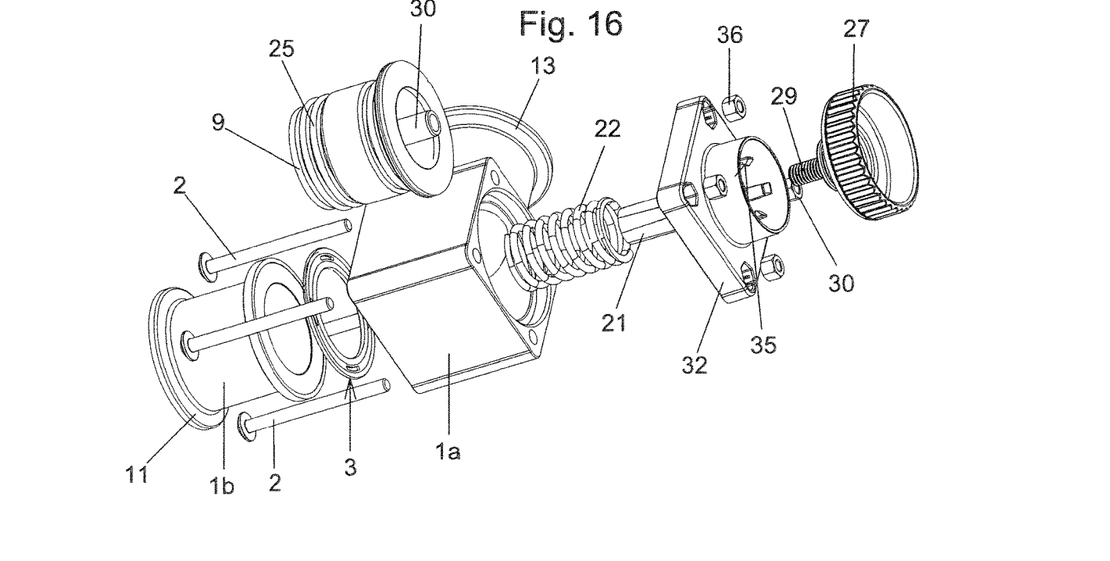
FIG. 16 shows an exploded representation.

Screws 2 serve for connecting the housing parts 1a, 1b. These screws penetrate bores in the housing part 1a (which cannot be seen in FIGS. 1 to 4, but are realized in an analogous manner to the second exemplary embodiment, cf. FIG. 15).

The heads of the screws 2 and/or flat washers inserted under said screw heads engage over the connecting flange 12 and consequently pull the housing part 1b toward the housing part 1a. The housing part 1a has an indentation 17 into which the connecting flange 12 is inserted. The bottom of the indentation 17 is advantageously realized in a stepped manner and has a first portion on which the connecting flange 12 rests and a second portion which is lower than said first portion, on which the housing seal 3d rests. With the housing parts 1a, 1b connected, the outermost top surface of the connecting flange 12—at least in the regions engaged over by the screws 2 and, where present, flat washers—is preferably flush with the portions of the outer top surface of the housing part 1a which connect to the connecting flange 12 and are covered by the screws 2 and, if present, flat washers.

The screws 2 are screwed into internal threads of the cylinder 14. Instead of this, they could also penetrate bores through the cylinder 14 and be screwed into nuts supported against the cylinder 14.

A very simple connection between the housing part 1a and the housing part 1b and also the cylinder 14 is achieved as a result of the realization described.

The tubular portion of the housing part 1b could also be omitted and the connection flange 11 could be arranged directly on the connecting flange 12.

The connecting connectors of the housing part 1a could equally be formed by a separate part which is connected to the housing part 1a by means of a screw connection. The tubular portion on which the connecting flange 13 is arranged could also be omitted and the connection flange 13 could be arranged directly on the basic body of the valve housing 1.

A closure member 9 which is realized, in particular in a plate-shaped manner, is arranged in the valve housing 1. In the closed (=sealed) state of the vacuum valve, the closure member 9 assumes its closed position and is pressed against the valve seat 4, cf. FIG. 4. The valve seat 4 is formed by a sealing face which, in the exemplary embodiment, is arranged on the second housing part 1b and by the ring-shaped seat seal 3c which rests on said sealing face. The closure member 9 comprises a, preferably flat, sealing face, by way of which it abuts against the seat seal 3c. The seat seal 3c is part of the sealing unit 3 which is explained in more detail further below.

The sealing face of the housing part 1b against which the seat seal 3c abuts is realized advantageously in a flat manner and is preferably located in a plane which is at right angles to the axis 7 of the valve opening 5 of the second housing part 1b.

Figure 1:
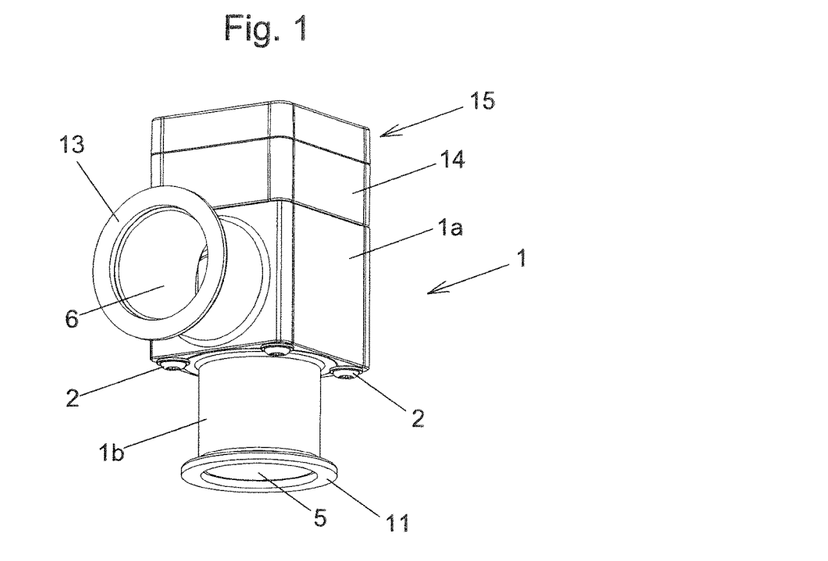
FIG. 1 shows a perspective view of an exemplary embodiment of a vacuum valve according to the invention.
Figure 2:
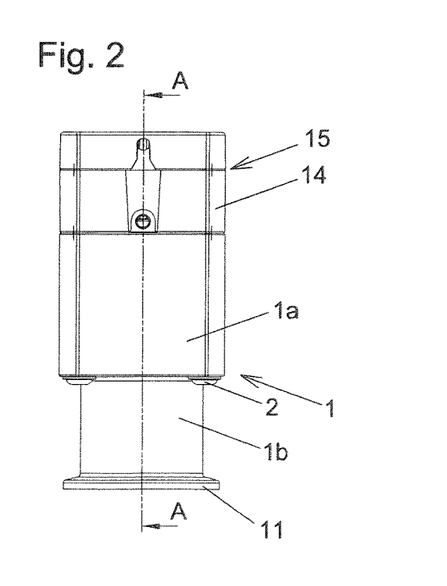
FIG. 2 shows a side view of the vacuum valve from FIG. 1.
Figure 3:
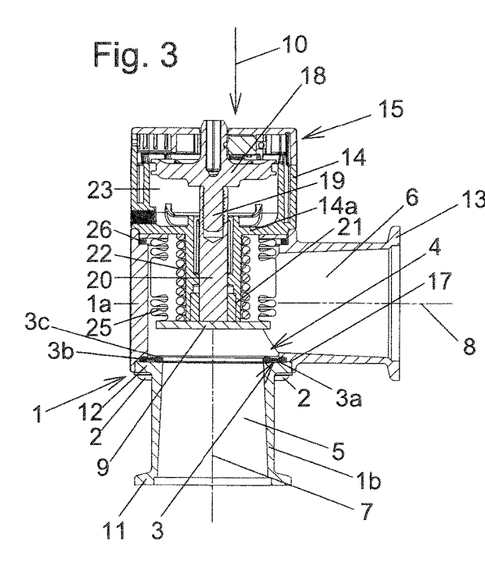
FIG. 3 shows a section along the line A-A of FIG. 2 with the closure member in the open position.
Figure 4:
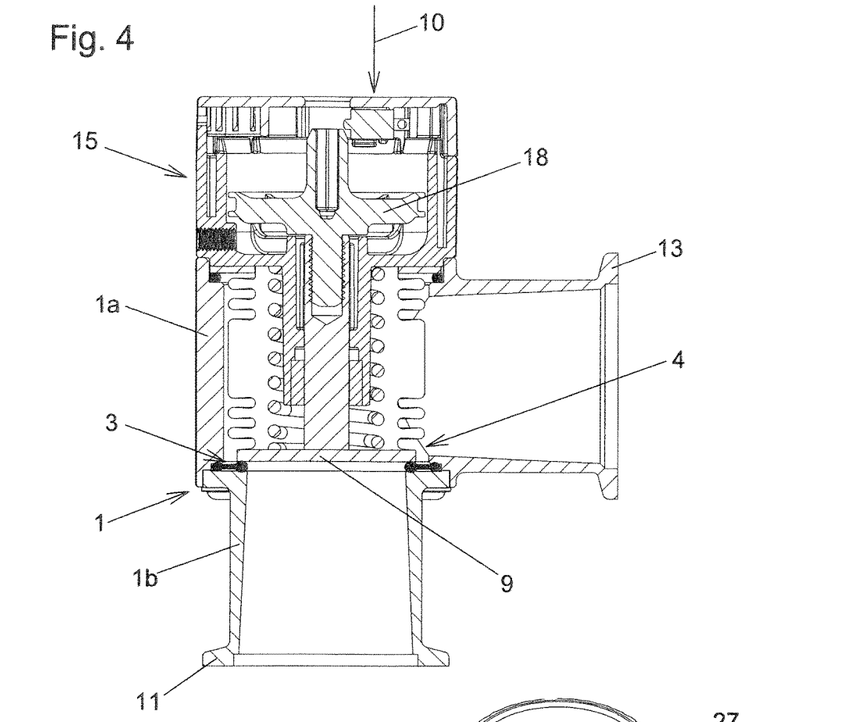
FIG. 4 shows a section along the line A-A of FIG. 2 with the closure member in the closed position.
Figure 5:
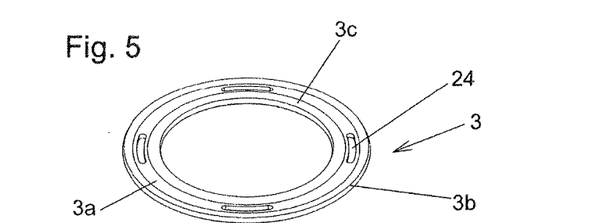
FIG. 5 shows a perspective view of the sealing unit.

With the vacuum valve completely open, the closure member 9 assumes an open position and is raised from the valve seat 4, see FIG. 3.

In said exemplary embodiment, the actuator 15, which has already been mentioned and is realized in the form of a pneumatic piston/cylinder unit, serves for opening and closing the vacuum valve. A piston 18 which is connected to the closure member 9 is arranged in the cylinder 14. A piston rod 19, which comprises an external thread and is screwed into an internal thread of a valve rod 20 mounted on the closure member 9, is mounted on the piston 18 for connecting the piston 18 to the closure member 9. The piston rod 19 could also comprise an internal thread and be screwed onto an external thread of the valve rod 20. The piston and valve rods 19, 20 could also be realized in an integral manner. The closure member 9 can be connected to the valve rod 20 so as to be releasable or can be mounted on said valve rod so as to be inseparable.

In the exemplary embodiment, the valve rod 20 is guided so as to be displaceable by a guide sleeve 21 which is mounted on the bottom 14a of the cylinder 14, for example is realized in an integral manner with said cylinder.

In the exemplary embodiment, a closing spring acts between the closure member 9 and the cylinder 14. When the cylinder 14 is pressure-less, the closure member 9 is pressed against the valve seat 4 by the closing spring 22 and the vacuum valve is closed. To open the vacuum valve, the cylinder chamber 23 is acted upon with compressed air and the piston 18 lifts the closure member 9 off the valve seat 4 in a direction opposite the force of the closing spring 22.

Instead of this, a double acting piston 18 could also be used or an opening spring, which acts for example between the piston 18 and the bottom 14a of the cylinder, could be used with a piston which simply acts in the opposite direction.

A bellows 25 serves for sealing the passage of the valve rod 20 through the valve housing 1 in the exemplary embodiment. Instead of this, for example an elastic sealing ring could also be arranged, for example, between the valve rod 20 and the guide sleeve 21.

The bellows 25 is realized, for example, as shown in the form of an undulating bellows. The undulations, in this connection, are indicated in the Figures only in the two end portions of the bellows 25. The bellows could also be realized as a concertina bellows or diaphragm bellows.

One end of the concertina bellows is connected in a vacuum-tight manner to the closure member 9, preferably welded to said closure member. The other end is connected in a vacuum-tight manner to the valve housing 1, for example by means of a welded flange ring and a sealing ring 26 which is inserted between the flange ring and the housing part 1a. The bellows 25 limits the vacuum range of the vacuum valve situated in the interior of the valve housing 1 which is able to be evacuated when the vacuum valve is built into a vacuum facility.

The sealing unit 3 shown in FIGS. 5 to 9 includes, as already mentioned, the ring-shaped, in particular circular ring-shaped housing seal 3b and the ring-shaped, in particular circular ring-shaped seat seal 3c. The housing seal 3b and the seat seal 3c are mounted on a common ring-shaped, in particular circular ring-shaped carrier 3a that has a radial extension, indicated at r in FIG. 8. The housing seal 3b, in this connection, is located radially outside the seat seal 3c and is preferably at a spacing from said seat seal.

The carrier 3a is formed of a material which differs from the elastic material from which the housing seal 3b is formed and from the elastic material from which the seat seal 3c is formed.

The housing seal 3b and the seat seal 3c preferably are made of the same elastic material.

The modulus of elasticity of the material from which the carrier 3a is made is greater, preferably at least 5 times greater, than the modulus of elasticity of the material from which the housing seal 3b is made, and is greater, preferably at least 5 times greater, than the material from which the seat seal 3c is made.

The sealing unit is advantageously realized so as to be self-supporting.

Figures 6, 7, 9:
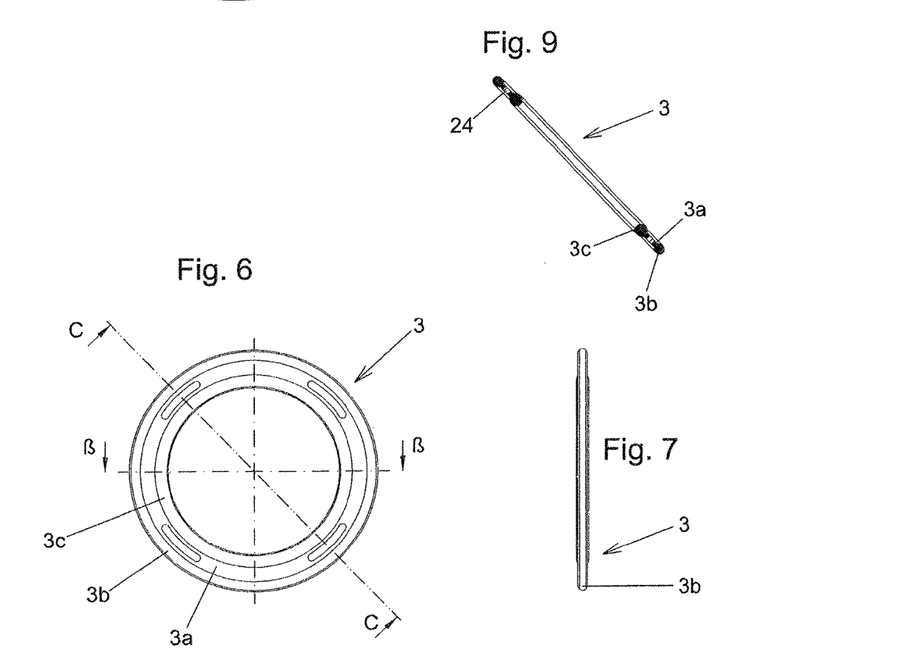
FIGS. 6 and 7 show a top view and a side view of the sealing unit.
FIG. 9 shows a section along the line C-C of FIG. 6.
Figure 8:
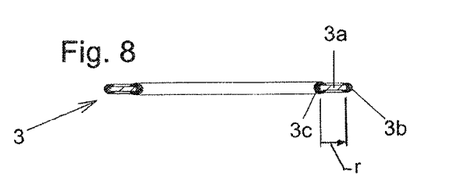
FIG. 8 shows a section along the line B-B of FIG. 6.
Figure 10:
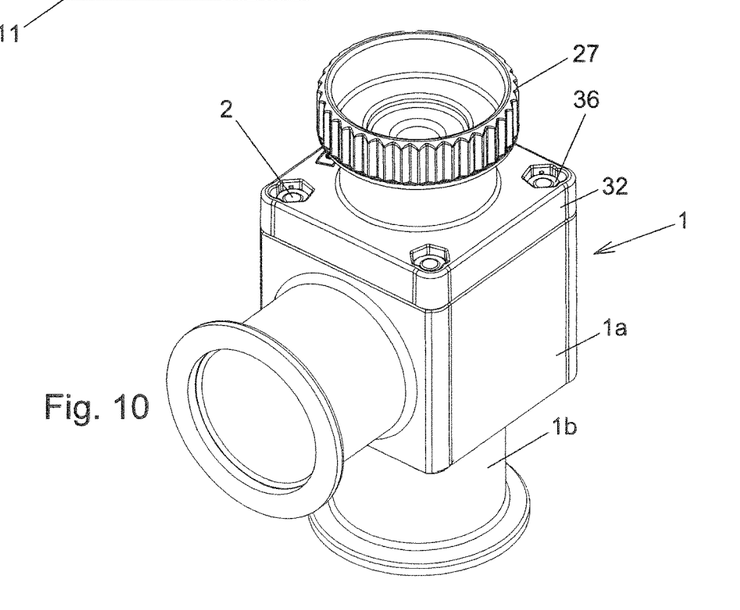
FIG. 10 shows a perspective view of a vacuum valve according to a second exemplary embodiment of the invention.
Figure 11:
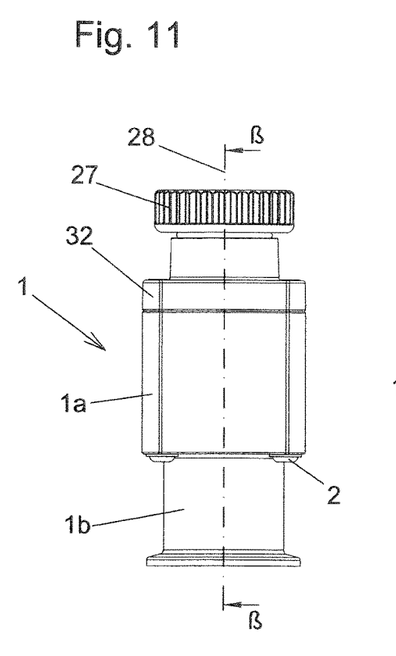
FIG. 11 shows a side view of the vacuum valve of FIG. 10.
Figure 12:
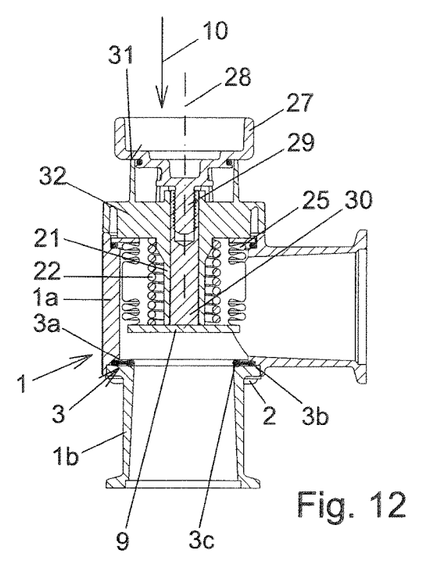
FIG. 12 shows a section along the line D-D of FIG. 11 with the closure member in the open position.

In the exemplary embodiment shown, the housing seal 3c protrudes radially outward beyond the outside periphery of the carrier 3a over the entire extension of the outside periphery of the carrier 3a the and the seat seal 3c protrudes radially inward beyond the inside periphery of the carrier 3a over the entire extension of the inside periphery of the carrier 3a, cf. in particular FIGS. 8 and 9.

In order to enable ventilation of the space between the carrier 3a and the sealing face on which the seat seal 3c rests, the carrier 3a is provided with through-passages 24.

The seat seal 3c can comprise, as shown, a greater thickness, measured in the direction of the axis 3d of the sealing unit 3, than the housing seal 3b.

The housing seal 3b and the seat seal 3c protrude above the carrier 3a in both axial directions, with reference to the axis 3d. In a favorable manner, the carrier 3a is realized in the form of a flat disk.

In one possible embodiment, the housing seal 3b and the seat seal 3c are vulcanized onto the carrier 3a to produce the sealing unit 3. The housing seal 3b and the seat seal 3c can be formed, for example, of FKM (Viton) or FFKM. In this embodiment the carrier 3a preferably is made of metal, for example aluminum or high-grade steel.

In another possible embodiment, the housing seal 3b and the seat seal 3c are integrally molded onto the carrier 3a. The housing seal 3b and seat seal 3c are formed in this case of a sprayable material, for example polyurethane. The carrier 3a preferably also comprises plastics material as a base material in this case, in particular a sprayable plastics material. The carrier 3a can consequently also be produced using an injection molding method. For example, the carrier 3a could be made of fiber-reinforced, in particular glass fiber-reinforced, polyarylamide, the fiber content in a preferred manner being within the range of between 20% and 60%, in a particularly preferred manner being 50%.

The sealing unit 3 is inserted between the housing parts 1a, 1b to assemble the vacuum valve. In addition, the unit including the actuator 15 and the closure member 9 as well as the bellows 25 is placed onto the housing part 1a with the sealing ring 26 inserted in between. The screws 2 are then screwed in.

A second exemplary embodiment is shown in FIGS. 10 to 16.

Apart from the differences described below, the realization of the vacuum valve according to said second exemplary embodiment corresponds to the first exemplary embodiment described previously. In particular, the sealing unit 3 is realized in an identical manner and its arrangement between the housing parts 1a, 1b corresponds to that of the first exemplary embodiment.

The vacuum valve according to the second exemplary embodiment is once again realized in the form of an angle valve. However, in this case a manual actuating means is provided for adjusting the closure member 9 between its open position and its closed position. In this connection, a rotational element 27 is rotated about the rotational axis 28. The rotational element 27 interacts with a screw transmission which includes a first driving part 29 which is connected to the rotational element 27 and a second driving part 30 which is connected to the closure member 9. One of the driving parts, in this case the first driving part 29, has an external thread which is in threaded engagement with an internal thread of the other driving part, in this case the second driving part 30. The closing spring 22 acts upon the closure member 9 in the direction of its closed position (irrespective of whether the closure member is situated in its open position or its closed position). With the closure member 9 in the open position, the rotational element 27 is supported on a stop 31 which is fixed to the valve housing 31. This stop 31 is arranged, for example, on a tube piece which protrudes from a housing cover 32. The housing cover 32 closes the open side of the housing part 1a in this exemplary embodiment in place of the cylinder 14. In this case, the housing cover 32 comprises the guide sleeve 21 which guides the rod-shaped second driving part 30 so as to be axially displaceable.

Figure 13:
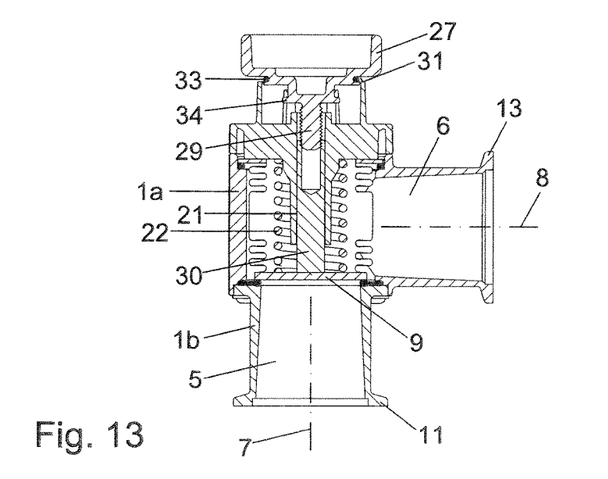
FIG. 13 shows a section along the line D-D of FIG. 11 with the closure member in the closed position.
Figure 14:
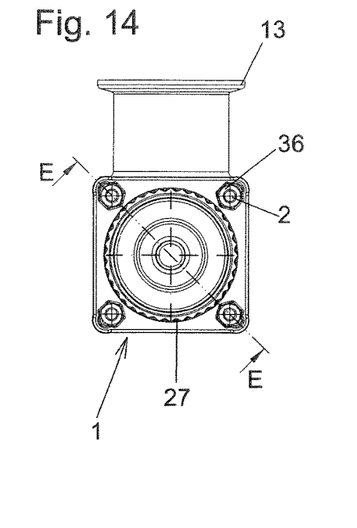
FIG. 14 shows a top view of the vacuum valve of FIG. 10.

When the vacuum valve is closed as a result of rotating the rotational element 27 and the closure member 9 approaches the valve seat 4 and the rotational element 27 is rotated further in the same direction of rotation as a result, the rotational element 27 can be lifted off the stop 31, cf. FIG. 13. In a favorable manner, it is then possible to see a marking ring 33 which indicates the achieving of the closed position of the closure member 9. The achieving of the closed position is also signaled in a haptic manner to the user by an annular collar 34 of the rotational element 27 moving to a stop 35, cf. in particular FIG. 15. The stop 35 is realized in a preferred manner such that when a limit value of the force acting upon it is exceeded, it yields such that the annular collar 34 is able to move past it. The maximum force that can be exerted on the seat seal 3c by the manual actuating means is limited as a result. Too high a stress load on the seat seal 3c is avoided as a result.

The assembly of the vacuum valve according to the second exemplary embodiment is effected in an analogous manner to the first exemplary embodiment. In place of the unit which includes the actuator 15, in this case the unit including the housing cover 32, the manual actuating means with the rotational element 27 and the closure member 9 connected thereto is placed onto the housing part 1a. The connecting of said unit to the housing part 1a, the sealing ring 26 being inserted in between, as well as of the housing parts 1a, 1b, the housing seal 3b of the sealing unit 3 being inserted in between, is effected once again by means of screws 2, onto which nuts 36 are screwed in this case.

Different modifications of the exemplary embodiments shown are conceivable and possible without departing from the area of the invention. Thus, for actuating the closure member 9 actuating means other than those shown could also be used. A realization according to the invention is also conceivable and possible in the case of vacuum valves other than angle valves, for example in the case of slide valves or L-valves. In the exemplary embodiments described, the closure member 9 is displaced in a linear manner to open and close the vacuum valve. Other types of adjusting the closure member are also conceivable and possible, e.g. the closure element could be guided to the valve seat as a result of an L-shaped movement, for example as a result of displacing and subsequently tilting the valve rod or by means of expanding members which act between the closure member and a linearly displaceable carrier unit.

| Key to the Reference Numerals: | |
| --- | --- |
| 1 | Valve housing |
| 1a | Housing part |
| 1b | Housing part |
| 2 | Screw |
| 3 | Sealing unit |
| 3a | Carrier |
| 3b | Housing seal |
| 3c | Seat seal |
| 3d | Axis |
| 4 | Valve seat |
| 5 | Valve opening |
| 6 | Valve opening |
| 7 | Axis |
| 8 | Axis |
| 9 | Closure member |
| 10 | Closing direction |
| 11 | Connection flange |
| 12 | Connecting flange |
| 13 | Connection flange |
| 14 | Cylinder |
| 14a | Bottom |
| 15 | Actuator |
| 17 | Indentation |
| 18 | Piston |
| 19 | Piston rod |
| 20 | Valve rod |
| 21 | Guide sleeve |
| 22 | Closing spring |
| 23 | Cylinder chamber |
| 24 | Through-passage |
| 25 | Bellows |
| 26 | Sealing ring |
| 27 | Rotational element |
| 28 | Rotational axis |
| 29 | First driving part |
| 30 | Second driving part |
| 31 | Stop |
| 32 | Housing cover |
| 33 | Marking ring |
| 34 | Annular collar |
| 35 | Stop |
| 36 | Nut |

The invention claimed is:

1. A vacuum valve comprising: a valve housing having a first housing part and a second housing part, between which a ring-shaped housing seal is arranged, a closure member in the valve housing adjustable between an open position in which the vacuum valve is open and a closed position in which the vacuum valve is closed, a carrier with a ring shape having a radial extension on which the ring-shaped housing seal is mounted, a ring-shaped seat seal mounted on the carrier radially inside the housing seal, the closure member is pressed against the ring-shaped seat seal for the closed position of the closure member, the seat seal abuts against a sealing face of the valve housing, and the sealing face that the seat seal abuts is flat and is located in a plane that extends at a right angle to an axis of a valve opening of the valve housing, and the carrier is formed of a material which differs from an elastic material from which the housing seal is made and from an elastic material from which the seat seal is made.

2. The vacuum valve according to one of claim 1, wherein the carrier comprises a greater modulus of elasticity than the housing seal and the seat seal.

3. The vacuum valve according to claim 2, wherein the modulus of elasticity of the carrier is at least 5 times greater than the modulus of elasticity of the housing seal and is also at least 5 times greater than the modulus of elasticity of the seat seal.

4. The vacuum valve according to 1, wherein the second housing part comprises the sealing face against which the seat seal abuts.

5. The vacuum valve according to claim 1, wherein the second housing part comprises a valve opening with an axis, and the sealing face against which the seat seal abuts surrounds the axis of the valve opening.

6. The vacuum valve according to claim 1, wherein the carrier is realized as a flat disk.

7. The vacuum valve according to claim 1, wherein the housing seal protrudes radially outward beyond the ring shape of the carrier over an entire outside periphery of the carrier and the seat seal protrudes radially inward beyond the ring shape of the carrier over an entire inside periphery of the carrier.

8. The vacuum valve according to claim 1, wherein the carrier comprises at least one through opening in a region located between the housing seal and the seat seal.

9. The vacuum valve according to claim 1, wherein the housing seal and the seat seal are vulcanized onto the carrier.

10. The vacuum valve according to claim 1, wherein the housing seal and the seat seal are integrally molded onto the carrier.

* * * * *